(12) United States Patent
Lin et al.

(10) Patent No.: US 6,464,366 B1
(45) Date of Patent: Oct. 15, 2002

(54) ILLUMINATION DEVICE PROVIDING LONGITUDINAL ILLUMINATION

(75) Inventors: Carin Lin, Windsor, NJ (US); Jung-Su Tsao, Tu-Chang (TW)

(73) Assignee: Bright View Electronics Co., LTD, Taipei Hsien (TW)

( * ) Notice: Subject to any disclaimer, the term of this patent is extended or adjusted under 35 U.S.C. 154(b) by 46 days.

(21) Appl. No.: 09/632,058

(22) Filed: Aug. 3, 2000

(51) Int. Cl.[7] .................................................. F21V 7/04
(52) U.S. Cl. .......................... 362/31; 362/27; 362/558; 358/484
(58) Field of Search ........................... 362/27, 31, 555, 362/558; 358/484; 385/146

(56) References Cited

U.S. PATENT DOCUMENTS

| | | | |
|---|---|---|---|
| 2,825,260 A | 3/1958 | O'Brien | 88/1 |
| 4,052,120 A | 10/1977 | Sick et al. | 350/96 |
| 4,172,631 A | 10/1979 | Yevick | 350/96 |
| 4,173,390 A | 11/1979 | Kach | 350/96 |
| 4,196,962 A | 4/1980 | Sick | 350/96 |
| 4,678,279 A | 7/1987 | Mori | 350/96 |
| 4,765,701 A | 8/1988 | Cheslak | 350/96 |
| 5,239,450 A | 8/1993 | Wall | 362/104 |
| 5,295,047 A | 3/1994 | Windross | 362/26 |
| 5,711,592 A | 1/1998 | Hotta | 362/80 |
| 5,808,295 A | 9/1998 | Takeda et al. | 250/216 |
| 5,835,661 A | * 11/1998 | Tai et al. | 385/146 |
| 5,839,813 A | 11/1998 | Smith | 362/32 |
| 5,905,583 A | * 5/1999 | Kawai et al. | 358/484 |
| 5,986,727 A | 11/1999 | Fukui et al. | 349/65 |

* cited by examiner

Primary Examiner—Sandra O'Shea
Assistant Examiner—Guiyoung Lee
(74) Attorney, Agent, or Firm—David M. Fortanato; Strook & Strook & Lavan LLP (57) ABSTRACT

An illumination device using an innovative design to provide a uniform, highly concentrated and substantially longitudinal illumination. The device includes, a compound light guide and a light-extracting section with a built-in light-extracting feature. The compound light guide comprises two optically coupled sub-guides. A first sub-guide has a constant cross-section area with a profile optimized for an integral light-concentrating optics, and a second sub-guide has a varying cross-section area for controlling local light flux density inside the light guide and providing assembly means. A light-homogenizing section provided at an input of the light guide improves illumination uniformity at an area close to a light input end of the light guide without displacing a light source from the central normal line of a light-extracting feature. The extracted light from the light-extracting feature forms an effective light-emitting object with a constant width for the integral light-concentrating optics and therefore, the width of the light-extracting feature can be modulated to improve illumination uniformity.

36 Claims, 7 Drawing Sheets

ILLUMINATION DEVICE PROVIDING LONGITUDINAL ILLUMINATION

FIELD OF THE INVENTION

The present invention relates generally to a compact and low-cost illuminating device employing a light guide to provide a longitudinal, uniform and highly concentrated illumination.

BACKGROUND OF THE INVENTION

Document processing devices such as scanners, fax-machines and electronic copy machines need a uniform, efficient and sufficiently intense longitudinal illumination on a target document. As a consequence of the requirement for both efficiency and intensity, a longitudinal illumination is preferred. The required illumination can be provided by a discharge tube such as a fluorescent lamp or a light-emitting-diode (LED) array consisting of a plurality of LEDs. Recently, with the advance in the LED technology and the sensor technology, the required illumination flux can be supplied by a couple of LEDs. Therefore, there is a need for an illumination device which can provide a longitudinal illumination for document processing devices by using a very limited number of LEDs.

It has been well known that a light guide such as optical fiber can guide light from a single light source to a desired location remote from the light source without encountering substantial transmission losses. Furthermore, a light guide with properly built-in light directing features along its length can be used to provide a longitudinal illumination. Illumination systems based on a light guide are formed by modifying the light guide to redirect an incremental amount of the total amount of light propagating through the guide laterally.

In general, two factors determine the distribution of illumination intensity of a device based on a light guide. The first factor is the local light flux density inside the light guide and the second factor is the local light-extracting efficiency. The amount of output light and consequently the intensity of illumination is proportional to the product of these two factors. Although a certain amount of output light is necessary for providing a certain intensity of illumination, a light-concentrating optics is further desirable to project substantially all of the all output light into a defined zone of a target plane in order to achieve a high energy efficiency and to reduce harmful scattered light.

A conventional method of increasing or reducing the local light flux density inside a light guide is to increase or reduce the local cross-section area of the light guide. However, varying the cross-section of a light guide usually eliminates or limits the possibility of integrating a light-concentrating optics into the light guide. In addition, an achievable modulation of local light flux density is limited because of possible violation of total internal reflection conditions.

In principle, the local light-extracting efficiency of a light guide can be modulated by varying the size of a light-extracting feature, for example, varying the depth or width of a reflective groove. However, width variation of a light-extracting feature as described in the prior art results in a proportional width variation of the illumination zone, which means no increase in illumination intensity despite an increase in output light flux. Depth variation of a reflective groove is accompanied by a big separation of individual grooves and consequently may result in an unacceptable high frequency intensity modulation in an illumination plane. Varying the gap between individual light-extracting features can be used to modulate output light amount as well, but this method has the same drawback as that of varying groove depth.

There are numerous methods by which a longitudinal light guide can be prepared to effect a lateral transmission of light. For example, the light guide can be cut with grooves at various points along its length, with one or more of the groove surfaces coated with a reflective material. Examples of illuminators prepared by the discussed techniques are generally disclosed in U.S. Pat. Nos. 4,052,120 issued to Sick et al.; U.S. Pat. No. 4,172,631 issued to Yevick; U.S. Pat. No. 4,173,390 issued to Kach; and U.S. Pat. No. 4,196,962 issued to Sick. Alternatively, grooves with profiles other than triangles and without using a reflective material can be used in a light guide as disclosed in U.S. Pat. No. 5,835,661 issued to Tai et al.

While illuminators prepared using techniques disclosed in the above-mentioned patents may provide some lateral light emission along a light guide, the illumination is generally divergent and a further control of illumination uniformity as required by document reading devices is not possible. Some prior art designs have tried to provide a means to concentrate illumination. See, for example, U.S. Pat. No. 2,825,260 to O'Brien which shows a triangular light guide, amongst other shapes; U.S. Pat. No. 4,678,279 to Mori which shows a modified cylindrical light conducting member; and U.S. Pat. No. 5,295,047 to Windross which uses an integral optical lens together with a light guide pipe having an isosceles triangular cross-section. Nevertheless, the light guides shown in these prior patents are generally not capable of being used to illuminate a longitudinal area with a sufficiently uniform intensity.

To achieve a good illumination uniformity, U.S. Pat. No. 5,808,295 issued to Takeda et al. and 5,905,583 issued to Kawai et al. use a light guide with variable cross-section and place a light source deviated sideward from the normal line passing through a center of the reflection area of the light guide. While the designs according to these prior patents improve the illumination uniformity, using variable cross-section also limit the possibility of using a light concentration feature to control the width and position of an illumination zone or achieve a highly concentrated illumination. Furthermore, placing a light source deviated sideward from the normal line of the reflection area constrains the freedom of LED packaging and assembly of LED to a light guide.

In addition, none of the designs according to the prior patents provides a simple and adequate assembling means for an illumination device to be integrated into a document processing device.

There thus exists a long felt and unresolved need to provide an illumination device that overcomes the above-described short comings of the prior art.

SUMMARY OF THE INVENTION

The present invention is directed to an illumination device that advantageously provides, in a novel and unobvious way, a substantially longitudinal, uniform, and concentrated light output. The illumination device is preferably constructed as a unitary structure including a light guide having first and second optically coupled sub-guides. A light-extracting feature is optically coupled to the first sub-guide and spaced apart from an entrance opening of the first sub-guide. The light-extracting feature redirects light within the light guide to form an effective light-emitting object at the entrance opening. Light from that light emitting object is projected out of the light guide by light-concentrating optics provided by the internal surfaces of the first sub-guide. The first sub-guide has a predetermined cross-sectional shape and a substantially uniform cross-sectional area along the longitudinal length of the light guide. The second sub-guide also has a predetermined cross-sectional shape but has a varying cross-sectional area along the longitudinal length of the light guide that controls light flux density within the light guide. An illuminating device constructed in accordance with the present invention thus provides a highly uniform illumination output with a high grade of light concentration, facilitates easy assembly, allows more freedom in light source packaging, and may be manufactured at a relatively low cost.

A light guide constructed in accordance with the present invention separates the functions of concentrating illumination output and controlling local light-flux intensity into first and second sub-guides optically coupled to each other. The light-extracting feature of the present invention generates an effective light-emitting object having a constant width for a light-concentrating optics. Illumination intensity output of the inventive illumination device may thus be modulated by varying the width of a light-extracting feature without affecting the width of the output illumination zone.

The first sub-guide of the light guide of the present invention has a predetermined cross-sectional shape and a generally constant area along its longitudinal length (i.e., along the longitudinal length of the light guide). The first sub-guide has an entrance opening through which light extracted by a light-extracting feature may pass and an output surface for emitting light output from the device. At least part of the internal peripheral surfaces of the first sub-guide also functions as light-concentrating optics to project light extracted by the light-extracting feature to an illumination target through the output surface.

In one embodiment of the present invention, the first sub-guide has a generally bell-shaped cross-section with a wider and a narrower opening. The wider opening generally comprises the output surface of the illumination device and the narrower opening generally comprises an entrance opening between the first sub-guide and a light-extracting section. The bell-shaped cross-sectional profile comprises two curved side surfaces and a curved output surface closing the wider opening of the bell-shape. Those surfaces work cooperatively as light-concentrating optics for projecting output light onto an illumination target. The narrower opening of the bell-shape is optically connected to a light-extracting section, which provides a light-extracting feature to redirect light striking thereon towards the narrower opening to form an effective light-emitting object for the light-concentrating optics. Cut-off of the correlation between the mechanical width of a light-extracting structure and the width of the illumination zone is achieved by locating the light-extracting feature a sufficient distance from the position of the effective light-emitting object.

The illumination uniformity provided by the inventive illumination device may be further controlled by providing a second sub-guide as part of the light guide and having a variable cross cross-section. The cross-section of the second sub-guide varies gradually along the longitudinal length of the light guide so that the local light flux density can be adjusted for a desired uniform illumination. When designed in accordance with the present invention, a second sub-guide can have a cross-section shape convenient for other purposes, such as, for example to facilitate the assembly of the light guide.

When LEDs are used as light source, the point-like characteristic of LEDs can cause a non-uniform illumination at a location close to the light-input end of the light guide. To offset this, the light guide of the present invention may employ a light-homogenizing section which improves the illumination uniformity of the light source by modulating characteristics of input light or shifting the propagation path of input light sideward without physically relocating the light source sideward from the central normal line of the light extraction feature.

The invention accordingly comprises the features of construction, combination of elements, and arrangement of parts which will be exemplified in the disclosure hearing, and the scope of the invention will be indicated in the claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PREFERRED EMBODIMENTS

The present invention is directed to an illumination device that advantageously provides, in a novel and unobvious way, a substantially longitudinal, uniform, and concentrated light output. The illumination device is preferably constructed as a unitary structure including a light guide having first and second optically coupled sub-guides. A light-extracting feature is optically coupled to the first sub-guide and spaced apart from an entrance opening of the first sub-guide. The light-extracting feature redirects light within the light guide to form an effective light-emitting object at the entrance opening. Light from that light emitting object is projected out of the light guide by light-concentrating optics provided by the internal surfaces of the first sub-guide. The first sub-guide has a predetermined cross-sectional shape and a substantially uniform cross-sectional area along the longitudinal length of the light guide. The second sub-guide also has a predetermined cross-sectional shape but has a varying cross-sectional area along the longitudinal length of the light guide that controls light flux density within the light guide.

Figure 1A:
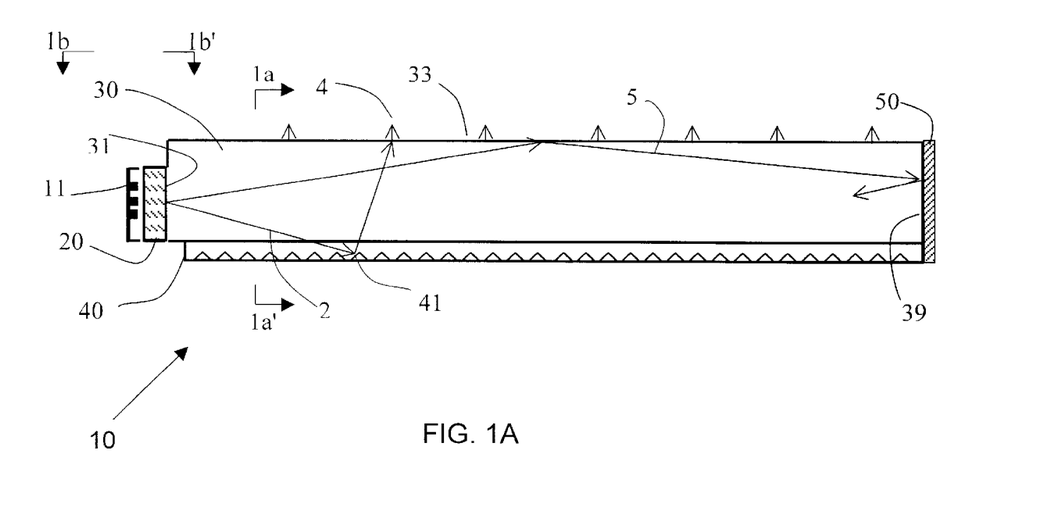
FIG. 1A is a side view of an illumination device constructed in accordance with an embodiment of the present invention.
Figure 1B:
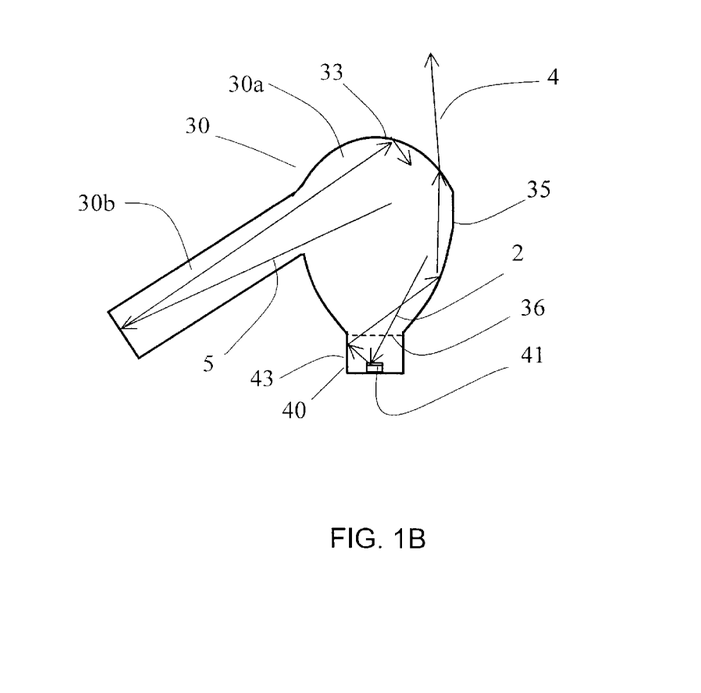
FIG. 1B is a cross-sectional view taken along the line A—A of FIG. 1A which depicts the cooperative relationship between the side surfaces and the output surface of the light guide to provide light-concentrating optics.

Referring to FIG. 1A of the drawings, there is illustrated a side view of an illumination device, generally designated 10, constructed in accordance with an embodiment of the present invention. In order to demonstrate the principle of this illumination device 10, FIG. 1B depicts a cross-sectional view of the illuminating device 10 taken along the line A—A of FIG. 1A. The illumination device 10 of the present invention is especially applicable to document processing devices, such as scanners, fax-machines, electronic copy machines and other general illumination applications, such as instrument illumination. The device 10 can function in an environment where space is limited and the light source is either compact or located remotely from the device 10.

As shown in FIG. 1A, the illumination device 10 includes a light guide 30 for transmitting light through its longitudinal length by internal reflection and having a light input end 31 through which light may enter the light guide 30 from a light source 11. The light guide 30 controls local light flux density inside the light guide 30 and projects light output from the device 10 using integral light-concentrating optics 35 (see, e.g., FIG. 1B). The inventive illumination device 10 also includes a light-extracting section 40 coupled to the light guide 30 along its longitudinal length for redirecting light by a light-extracting feature 41 toward the output surface 33 of the light guide 30, and a reflector 50 at end 39 of the light guide 30 located longitudinally opposite of the light input end 31 and for recycling light back into the light guide 30. A light homogenizing section 20 may be provided between the light source 11 and light guide 30 for improving the local illumination uniformity close to the light source 11. Suitable light sources include a LED, an LED array, an incandescent light source, a laser, or other similar light generating source. The light source 11 may produce a single color of light, or multiple colors of light, as a matter of design choice.

Referring to FIGS. 1A and 1B, after a light ray 2 enters the light guide 30 at its light input end 31, it may encounter the light-extracting feature 41 in the light-extracting section 40, as indicated by a ray path 2, and is thereby redirected toward an opening 36 of the light guide 30 and further projected by the integral light-concentrating optics 35 out of the device 10 as output light 4. Alternatively, the light may propagate along the entire length of the light guide 30 and be reflected back by a reflector 50 at the another end 39, as indicated by a ray path 5.

Figure 2:
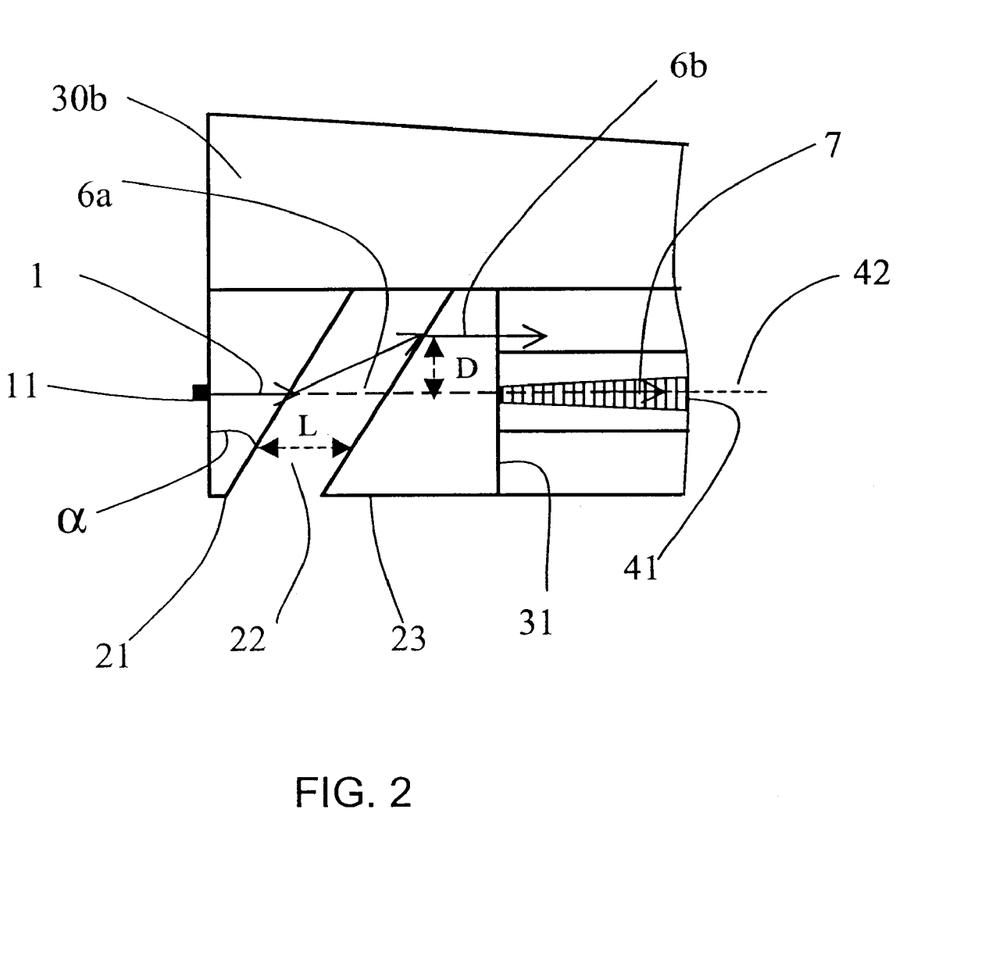
FIG. 2 is a cross-sectional view taken along the line B—B of FIG. 1A depicting a light-homogenizing section in accordance with an embodiment of the present invention.

With continued reference to FIG. 1A and with additional reference to FIG. 2, the light homogenizing section 20 may be located between the light source 11 and the light guide 30. Without the light homogenizing section 20, and for a point-like light source 11, such as, for example, an LED aligned with a central normal line 42 of the light-extracting feature 41, a significant amount of light propagating in the direction around the normal of the light source 11 would encounter the light-extracting feature 41 immediately after entering the light guide 30, as indicated by the dashed arrow line 7, and would be extracted by the light-extracting feature 41 for output illumination. This output would lead to a local rise of illumination intensity because light propagating around a source's central normal direction has higher intensity. In the light-homogenizing section 20 depicted in FIG. 2, a light ray 1 propagating in a direction indicated by line 6a is deflected by a first optical wedge 21, passes through an air gap 22, and enters a second optical wedge 23. The two optical wedges 21, 23 are constructed to optically compensate each other so that the light ray 1 passing through two optical wedges 21, 23 propagates along a path substantially parallel but shifted with respect to its original path, as indicated by line 6b. Because of this sideward shift, high intensity light rays will not encounter the light-extracting feature 41 close to the light input end 31 of the light guide 30, avoiding a local intensity rise. This uniformity improvement is achieved by using the light-homogenizing section 20 comprising two compensating wedges 21, 23 with an air gap 22 located between them, without having to physically shift the position of the light source 11, as proposed by prior art patents. The shift distance D introduced by two optical wedges 21, 23 with an air gap 22 located can be calculated using the following formula:

$$D = L * \tan(\alpha \sin(n * \sin \alpha)) \tag{1}$$

where L is the thickness of the air gap 22, n is the refractive index of the light guide material, and α is the wedge angle. For α=20 degree, n=1.5 and L=3 mm, D is approximately 0.6 mm, which is sufficiently large for a light-extracting feature 41, that is, for example, only 0.4 mm wide.

Figure 3A:
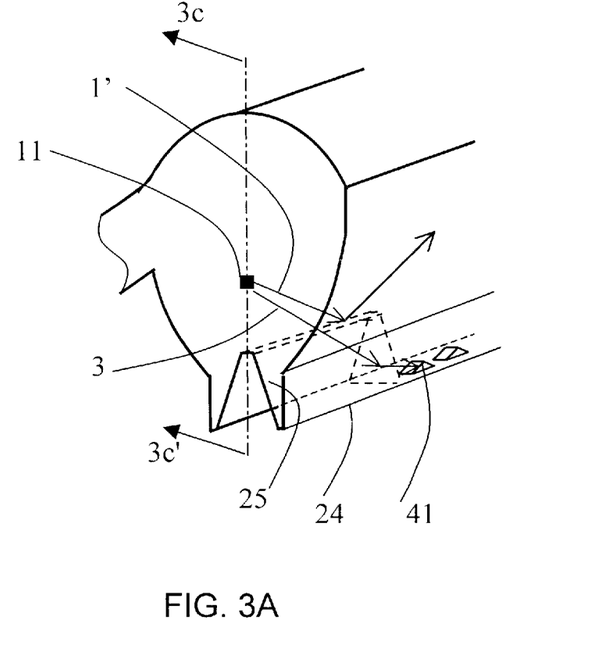
FIG. 3A is a perspective view of a light-homogenizing section of an illumination device constructed in accordance with an embodiment of the present invention.
Figure 3B:
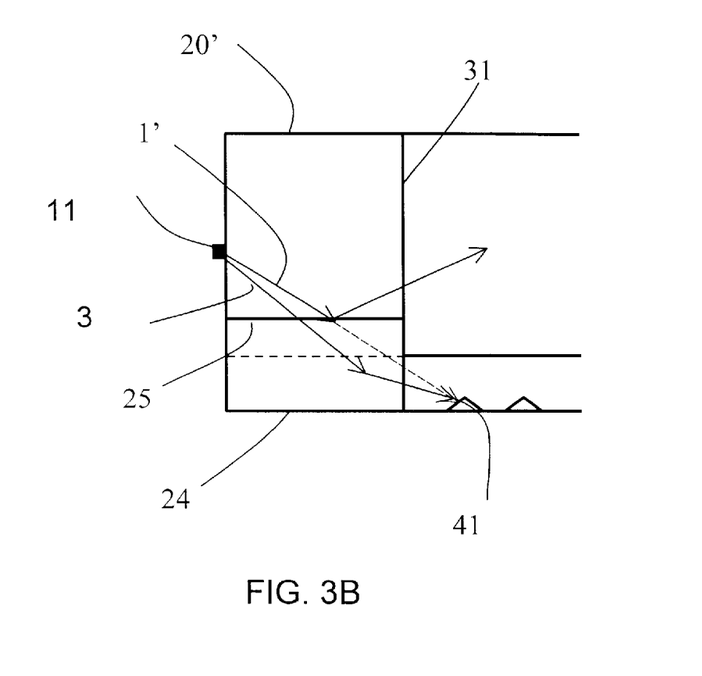
FIG. 3B is a cross-sectional side view taken along the line C—C of FIG. 3A.

In another embodiment of the present invention, intensity uniformity at an illumination area close to the light guide light input end 31 can be improved by blocking high intensity light rays from hitting the light-extracting feature 41 immediately, as depicted in FIGS. 3A and 3B. In another embodiment of the light-homogenizing section 20' depicted in FIGS. 3A and 3B, the central part of the bottom 24 of the section 20' is raised to form a step 25 or notch which prevents a high intensity light ray 1' output from the light source 11 from immediately contacting the light-extracting feature 41. The step 25 may have a trapezoidal cross-section so that a relatively low intensity light ray 3 entering the light guide 30 from the light source 11 in a direction not in the plane containing the central normal line of the light-extracting feature 41 may encounter the light-extracting feature 41 close to the light input end 31 of the light guide 30 to provide necessary illumination light. The exact dimensions of the step 25 depend on the dimension of the light guide 30 and the relative position of light source 11. For example, the top width of the step 25 should be not narrower than the width of the light source 11. The height H of the step 25 may be determined using the following formula:

$$H = hs * Le/(Le + d) \tag{2}$$

where hs is the height of the light source measured from the plane of the light-extracting feature 41, d is the length of the light-homogenizing section 20, and Le is the entrance length of the light guide 30 over which no light rays from the light source 11 should hit the light-extracting feature 41 directly. For example, for hs=1 mm, d=4 mm and Le=10 mm, H is approximately equal to 0.7 mm.

The light-homogenizing section 20 having two optical wedges 21, 23 (see, e.g., FIG. 2) is preferably used in connection with an illumination device 10 having a light guide 30 with a relatively small cross-sectional area, and the light-homogenizing section 20' having a step 25 (see, e.g., FIG. 3A) is preferably used in connection with an illumination device 10 having a light guide 30 with a relatively large cross-sectional area.

Figure 4:
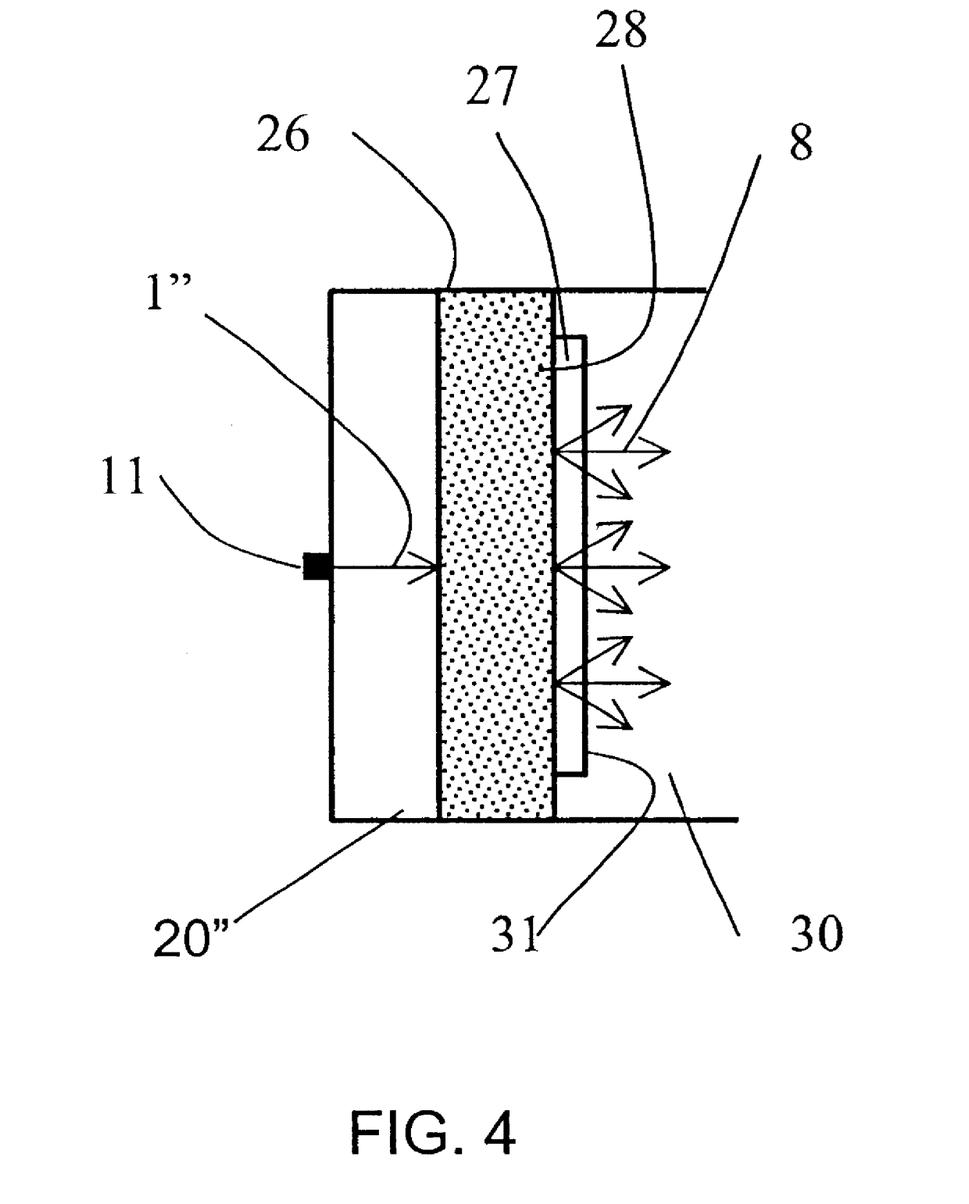
FIG. 4 is a cross-sectional view of a light-homogenizing section constructed in accordance with an embodiment of the present invention.

If LEDs are used as light source 11, the point-like characteristic of LEDs may result in an unacceptable and irregular pattern in the illumination area close to the light input end 31 of the light guide 30. In yet another embodiment of the present invention, and with reference to FIG. 4, the light-homogenizing section 20" comprises a light diffusing component. Light rays 1" emitted by a point-like LED 11 first enter a light diffusing plate 26 and exit the diffusing plate 26 as an expanded light beam 8, thereby effectively forming a secondary light source with a much larger emitting area than the LED light source 11. To ensure that conditions for total internal reflection are still fulfilled inside the light guide 30, an air-gap 27 is provided between the output surface 28 of the diffusing plate 26 and the light input end 31 of the light guide 30. In practice, this kind of light diffusing plate 26 may be made as a cover plate of an LED array, or it may be inserted as a separate plate into a gap between the light source 11 and the light input end 31 of the light guide 30. Alternatively, it can be made by injecting a curable light-diffusing resin into a gap located at the light input end 31 of the light guide 30.

The use of a light homogenizing section 20, as described in the various embodiments thereof above, for achieving improved intensity uniformity in the illumination area close to the light guide entrance is a matter of design choice. This local intensity uniformity may be achieved using a light-extracting feature in accordance with the present invention, as described in more detail below.

Figure 5:
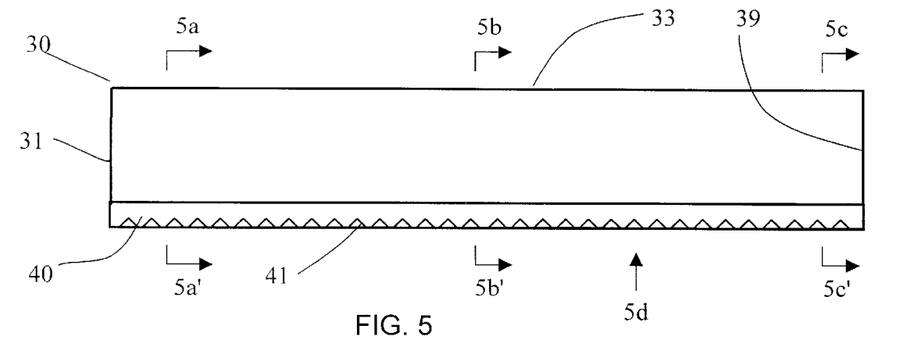
FIG. 5 is a side view of a light guide constructed in accordance with an embodiment of the present invention.
Figure 6A:
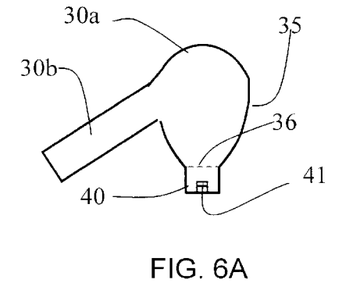
FIGS. 6A–6C are cross-sectional views taken along the lines A—A, B—B and C-C of FIG. 5.
Figure 6B:
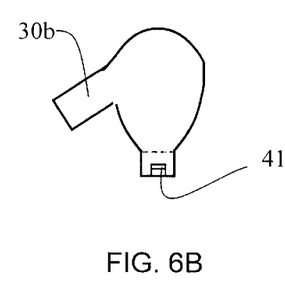
Figure 6C:
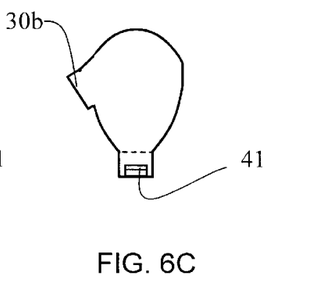

Referring next to FIGS. 5 and 6A–6C, the light guide 30 comprises a first sub-guide 30a and a second sub-guide 30b that are optically coupled to each other to perform the common function of guiding the propagation of light. In addition, each sub-guide 30a, 30b has its own unique function. As shown in FIGS. 6A–6C, the first sub-guide 30a has a generally bell shaped cross-section with a profile comprising several curved segments which define a peripheral interior surface that provides light-concentrating optics 35 (see, e.g., FIG. 1B) to project light extracted by the light extracting feature 41 (i.e., prismatic structure) for illumination out of the device 10. The second sub-guide 30b has a cross-section with an area that varies gradually along the longitudinal length of the light guide 30 (see, e.g., FIGS. 6A–6C) to control the local light density inside the light guide 30 and consequently to control the intensity uniformity of illumination output from the device 10.

With continued reference to FIGS. 6A–6C, which depict three cross-sectional views of the light guide 30 at the positions as indicated by lines A—A, B—B and C—C of FIG. 5, the varying cross-sectional area of the second sub-guide 30b gradually decreases along the longitudinal length of the light guide 30. The decreasing cross-sectional area of the second sub-guide 30b causes light rays to propagate in close proximity with each other within the light guide 30 which in turn increases the local light flux density. As a result of an increased light flux density, more light can be extracted by the prismatic structure 41 for illumination.

If a light source 11 is provided at both ends of the light guide 30 (not shown), the cross-sectional area of a second sub-guide 30b in preferably minimal at the longitudinal mid-point of the light guide 30. The embodiment depicted in FIGS. 6A–6C is for a single light source 11.

Although the second sub-guide 30b depicted in FIGS. 6A–6C preferably has a rectangular cross-sectional shape, it may have a cross-section of virtually any shape as long as it does not destructively affect the function of the light-concentrating optics 35 of the first sub-guide 30a. To exclude any destructive influence on the light-concentrating optics 35, the second sub-guide 30b should be not directly visible to extracted light rays. Provided that condition is satisfied, the second sub-guide 30b may have a cross-sectional shape which benefits other needs, e.g., a generally rectangular cross-section for convenient assembly.

To achieve a uniform illumination output, the reduction rate of the cross-sectional area of the second sub-guide 30b should compensate the reduction rate of light flux density due to continuous light extraction along the light guide length. Then, a uniform light extraction can be achieved if a constant light-extracting efficiency is assumed. In general, the required area reduction rate is linearly proportional to the total light-flux reduction rate. However, in practice besides light extraction, inevitable loss due to scattering or absorption also contributes to the total light-flux reduction. Therefore, a higher reduction rate of the cross-sectional area may be needed. On the other hand, too fast a reduction of the cross-sectional area may cause significant light flux loss, typically because of violation of total internal reflection conditions. Thus, required illumination uniformity may require a higher compensation rate of light flux density, which is not achievable by reducing the cross-sectional area of a light guide.

Figure 7:
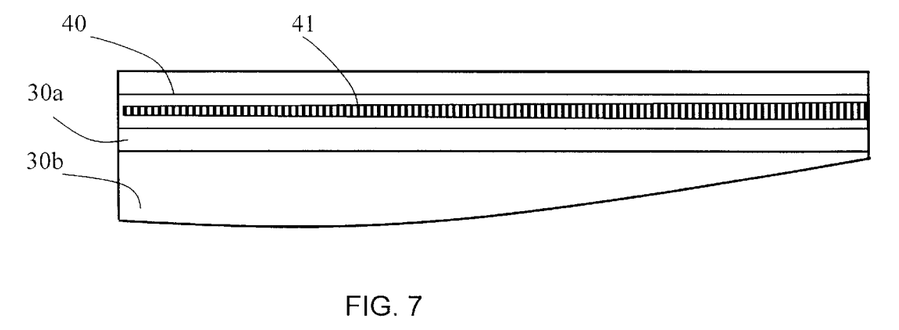
FIG. 7 is a bottom view of the light guide depicted in FIG. 5 as indicated by arrow D, illustrating the relative position, shape and sizes of the sub-guides, light-extracting section and light-extracting feature.

In accordance with the principle of the present invention, modulating the light-extracting efficiency may provide another means to achieve illumination uniformity. Referring next to FIG. 7, a bottom view of the light guide 30 with a light-extracting section 40 is there depicted and which clearly shows the varying width of the light-extracting feature 41 along the longitudinal length of the light guide 30. In this exemplary, non-limiting embodiment, the light-extracting feature 41 comprises an array of prismatic structures, with an equal height and a constant pitch arranged along the length of the light guide 30 (see, e.g., FIGS. 9A–9C). A variation in the width of such a light-extracting feature 41 corresponds to a variation of light-extracting efficiency and consequently a modulation in the output light flux for illumination.

However, an increase in light-extracting efficiency based on a width increase of a light-extracting feature 41 does not necessarily lead to an increase in the illumination intensity, especially when light-concentrating optics 35 are used. In the prior art designs, an increase in the width of a light-extracting feature leads to a proportional increase in the width of an output illumination zone, but does not result in an increase in the output illumination intensity. For a document processing device, illumination intensity rather than total light flux is specified to characterize an illumination uniformity. Light-extracting efficiency may be modulated by changing the linear density of light-extracting features 41, such as, for example, by changing the pitch of prismatic structures. To make this approach work, a significantly large gap must be maintained between light-extracting features 41 which may disadvantageously introduce an undesirable high frequency intensity modulation into a illumination plane. Although the magnitude of this high frequency modulation may be minimized by using very small light-extracting features 41, the required precision and additional cost make this choice either unpractical or very expensive.

In accordance with the present invention, an illumination device 10 includes an effective light-emitting object having a constant width to solve the above-described problem with the prior art. The light-concentrating optics 35 depicted in FIG. 1B are designed to work with this effective light-emitting object rather than directly to work with the original light-extracting features 41. Still referring to FIG. 1B, a light-extracting section 40 is located outside the bell shaped cross-section of the first sub-guide 30a. When a light ray 2 encounters the light-extracting feature 41, it is redirected generally upwards and into the first sub-guide 30a. Since the light-extracting feature 41 is located sufficiently deep inside the light-extracting section 40, this light ray may experience one or more reflections on a side wall 43 of the light-extracting section 40 before reaching an entrance opening 36 of the first sub-guide 30a. Such reflections may occur with many light rays redirected by the light-extracting feature 41. As a result, the entire opening 36 may be filled up with extracted light rays regardless of the original width of the light-extracting feature 41 as long as the light-extracting feature 41 is spaced a sufficient distance from the opening 36. Because of this property, the opening 36 can be used as an effective light-emitting object for the light-concentrating optics 35 so a projected illumination zone will have a width that is correlated only with the width of the opening 36 and independent of the actual width of the light-extracting feature 41. Therefore, by placing a light-extracting feature 41 a sufficient distance from the opening 36 of a light-concentrating optics 35, the width of the light-extracting feature 41 may be varied to modulate illumination uniformity without affecting the width of the illumination zone. The required separation distance between the light-extracting feature 41 and the opening 36 depends on the entrance width of a light-concentrating optics 35 and the angular distribution of extracted light rays in the plane parallel to the entrance width. In general, to form an effective light-emitting object, the required distance G between a light-extracting feature 41 and the opening 36 of light-concentrating optics 35 may be determined using equation (3):

$$G=(W-b)/2/\tan(A/2) \quad (3)$$

where, W is the entrance (i.e., opening 36) width, b is the minimum width of a light-extracting feature 41, and A is the half angular with of emitted light in the plane parallel to the entrance width and is always less than 90 degrees. For W=0.8 mm, b=0.4 mm, and A=42 degrees, G is approximately equal to 0.52 mm.

Figure 8:
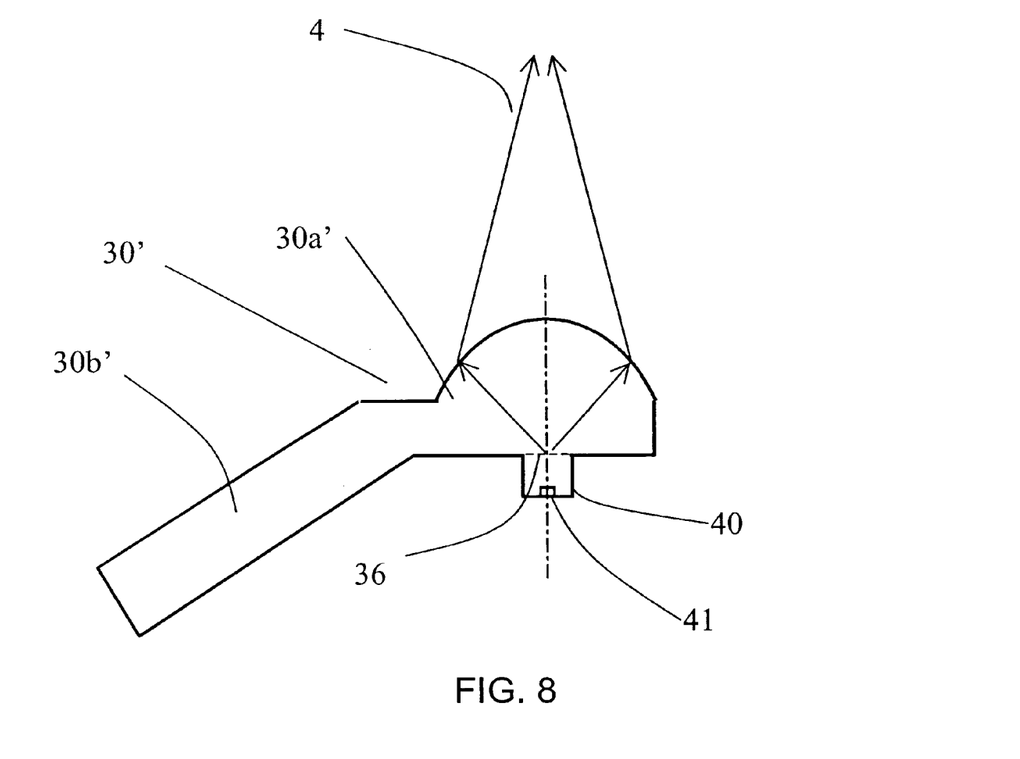
FIG. 8 is a cross-sectional view of a light guide in accordance with an embodiment of the present invention.

The concept of an effective light-emitting object in accordance with the present invention may also be applied to a first sub-guide 30a having a cross-sectional shape other than a bell-shape, as depicted in FIG. 8. The light guide 30' includes a first sub-guide 30a' having a generally dome-shaped cross-section with the light-extracting section 40 coupled to an entrance opening 36 of the first sub-guide 30a'.

As shown in FIG. 7, the width of individual prismatic structures 41 in this exemplary embodiment generally increases from the light input end 31 of the light guide 30 toward the other end 39 because the light guide 30 accepts input light from only one end. In the case of an illumination device 10 accepting input light from both ends, a light-extracting feature 41 in accordance with this invention will have its width increased gradually from both ends toward the longitudinal middle of the light guide 30, where the width of the light-extracting feature 41 will be the greatest.

Figure 9A:
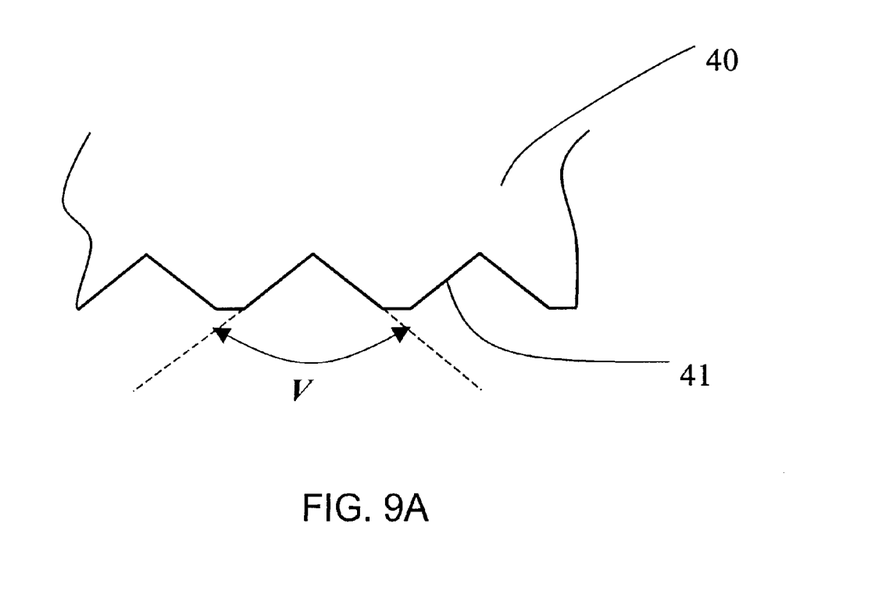
FIGS. 9A–9C are side views of embodiments of prismatic structures in accordance with the present invention.

Preferably, the generally triangular prismatic structures 41 used light-extracting feature in the exemplary embodiment are arranged to have their apex pointing inward toward the light-extracting section 40, as shown in FIG. 9A. For prismatic structures 41 having substantially straight side surfaces, such as those depicted in FIG. 9A, an opening angle V of between approximately 60° and 80°, or between approximately 95° and 120° is preferred. The choice of the opening angle V depends on the refractive index of the light guide 30 and acceptable illumination angular distribution. If an opening angle between approximately 95° and 120° is used, a reflective coating may be applied to the prismatic structures 41 to enhance reflection and reduce light loss. Such reflective coatings can be made by either vacuum deposition, painting or thermal stamping, or by other art-recognized optical coating techniques or methods. Alternatively, an external reflector (not shown) may be attached to the bottom of a light-extracting section 40 to reflect light back into the light guide 30.

Figure 9B:
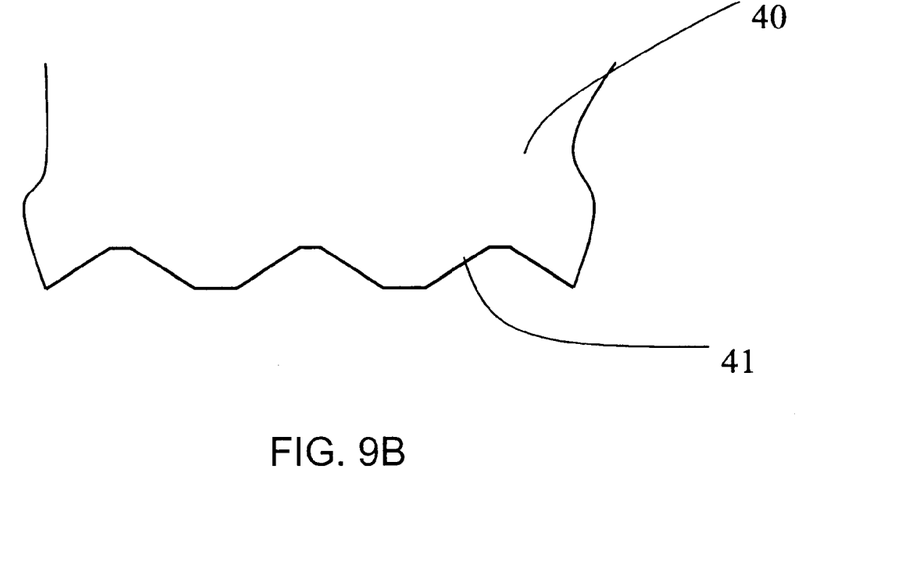
Figure 9C:
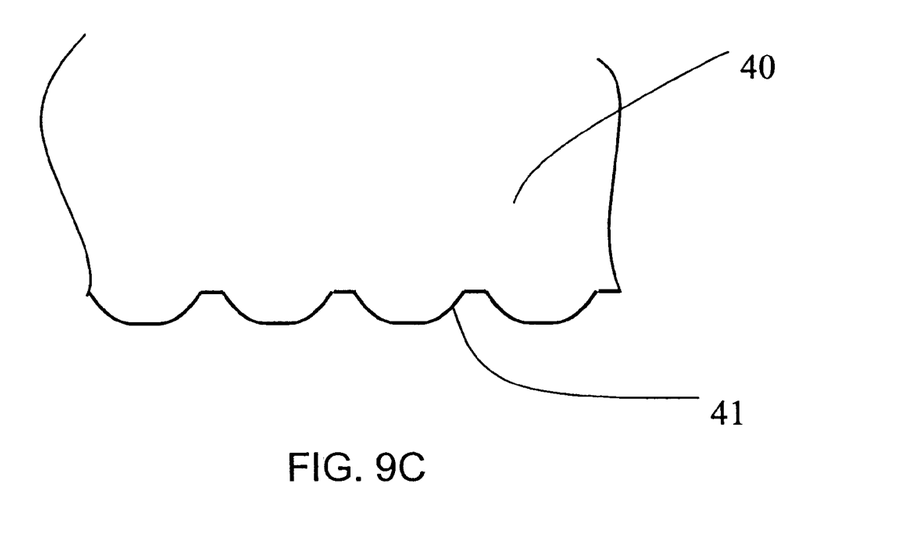

Prismatic structures used as light-extracting features 41 may have different cross-sectional profiles such as, by way of non-limiting example, a trapezoidal profile as depicted in FIG. 9B, or a profile comprising at least one curved segment as depicted in FIG. 9C. By using prismatic structures with curved surfaces, the angular distribution of output light in the plane parallel to the light guide length can be further modulated as needed and light leakage loss on prism surfaces can be further reduced.

Besides prismatic structures, other light reflecting or light scattering structures and materials may also be used as light-extracting features such as, for example, a white-paint strip with a varying width.

Although the light guide 30 disclosed herein is depicted in the drawing figures as substantially straight, a curved light guide 30 such as, for example, a generally circular, semi-circular, elliptical, oval, etc., is also contemplated by the present invention.

In another embodiment of the present invention, and for applications requiring a relatively short light guide 30 where light output uniformity may be easily achieved, alternate constructions of the light guide 30 may be provided. For example, the second sub guide 30b may be optional. Alternatively, a second sub-guide 30b having a substantially uniform cross-sectional are over its longitudinal length may be provided. In yet another alternative embodiment, the second sub-guide 30b may have a varying cross-sectional area, as described in detail above, and a light-extracting feature 41 having a substantially constant width.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. An illumination device for receiving light input from a light source and for producing light output, said illumination device comprising:

a light guide comprising generally parallel and optically coupled first and second sub-guides, said first sub-guide having a generally constant cross-sectional area along the longitudinal length of said light guide and having an entrance opening extending longitudinally along said light guide, said second sub-guide having a varying cross-sectional area along the longitudinal length of said light guide, said first sub-guide providing light-concentrating optics integral to said light guide and the operation of said light-concentrating optics being unaffected by said second sub-guide;

a light-homogenizing section located between the light source and a light input end of said light guide for redirecting light input from the light source into said light guide;

a light-extracting section optically coupled to said first sub-guide at said entrance opening and extending substantially longitudinally therealong, said light-extracting section having a light-extracting feature located in spaced apart relation to said entrance opening and having a width varying along the longitudinal length of said light-extracting section; and a reflector located at an end of said light guide longitudinally opposite from said light input end of said light guide;

wherein when light from the light source enters said light guide through said light-homogenizing section, said varying cross-sectional area of said second sub-guide controls a light flux density inside said light guide, a portion of light propagating inside said first sub-guide being redirected by said light-extracting feature inside said light-extracting section to form an effective light-emitting object at said entrance opening, the portion of light being further projected by said integral light-concentrating optics to provide a substantially longitudinal, uniform and concentrated light output of said device.

2. An illumination device for receiving light input from a light source and for producing light output, said illumination device comprising:

a light guide comprising generally parallel and optically coupled first and second sub-guides, said first sub-guide having a generally bell-shaped cross-section with a constant area along the longitudinal length of said light guide and having an entrance opening extending longitudinally along said light guide, said second sub-guide having a generally rectangular shaped cross-section with varying cross-sectional area along the longitudinal length of said light guide, said first sub-guide providing light-concentrating optics integral to said light guide and the operation of said light-concentrating optics being unaffected by said second sub-guide;

a light-homogenizing section located between the light source and a light input end of said light guide for redirecting light input from the light source into said light guide;

a light-extracting section optically coupled to said first sub-guide at said entrance opening and extending substantially longitudinally therealong, said light-extracting section having an array of prismatic structures for extracting light and located in spaced apart relation to said entrance opening and having a width varying along the longitudinal length of said light-extracting section;

a reflector located at an end of said light guide longitudinally opposite from said light input end of said light guide;

wherein when light from the light source enters said light guide through said light-homogenizing section, said varying cross-sectional area of said second sub-guide controls a light flux density inside said light guide, a portion of light propagating inside said first sub-guide being redirected by said prismatic structures inside said light-extracting section to form an effective light-emitting object at said entrance opening of said integral light-concentrating optics, the portion of light being further projected by said integral light-concentrating optics to provide a substantially longitudinal, uniform and concentrated light output of said device.

3. An illumination device as recited by claim 1 or 2, wherein said light-homogenizing feature comprises two optical wedges both having a wedge refractive index and separated by a gap made of a transparent material having a refractive index lower than that of said wedge refractive index.

4. An illumination device as recited by claim 1 or 2, wherein said light-homogenizing feature comprises a step having a trapezoidal cross-section.

5. An illumination device as recited by claim 1 or 2, wherein said light-homogenizing section comprises a light-diffusing plate.

6. An illumination device as recited by claim 1 or 2, wherein said light-homogenizing section comprises a curable light-diffusing resin.

7. An illumination device as recited by claim 2, wherein each of said prismatic structures in said array has a generally triangular cross-section.

8. An illumination device as recited by claim 2, wherein each of said prismatic structures in said array has a generally trapezoidal cross-section.

9. An illumination device as recited by claim 7 or 8, wherein said cross-section of each of said prismatic structures in said array comprises at least one curved segment.

10. An illumination device as recited by claim 1, wherein said first sub-guide has a dome-shaped cross-section.

11. An illumination device as recited by claim 1 or 2, further comprising an external reflector covering an outer surface of said light-extracting section.

12. An illumination device as recited by claim 2, further comprising a reflective coating on a surface of each of said prismatic structures in said array.

13. An illumination device as recited by claim 1 or 2, wherein said reflector is a reflective coating at an end of said light guide longitudinally opposite from said light input end of said light guide.

14. An illumination device as recited by claim 1 or 2, wherein said varying cross-sectional area of said second sub-guide decreases in a direction generally longitudinally away from said light input end of said light guide.

15. An illumination device as recited by claim 1 or 2, wherein said varying width of said light-extracting feature increases in a direction generally longitudinally away from said light input end of said light guide.

16. An illumination device as recited by claim 1 or 2, wherein a light source is provided at opposite longitudinal ends of said light guide and wherein said varying cross-sectional area of said second sub-guide is minimal at a longitudinal mid-point of said light guide.

17. An illumination device as recited by claim 1 or 2, wherein a light source is provided at opposite longitudinal ends of said light guide and wherein said varying width of said light-extracting feature is greatest approximately at a longitudinal middle of said light guide.

18. An illumination device for receiving light input from a light source and for producing light output, said illumination device comprising:

a light guide having an input end for receiving light input from the light source and comprising generally parallel and optically coupled first and second sub-guides, said first sub-guide having a generally constant cross-sectional area along the longitudinal length of said light guide and having an entrance opening extending longitudinally along said light guide, said second sub-guide having a varying cross-sectional area along the longitudinal length of said light guide, said first sub-guide providing light-concentrating optics integral to said light guide and the operation of said light-concentrating optics being unaffected by said second sub-guide;

a light-extracting section optically coupled to said first sub-guide at said entrance opening and extending substantially longitudinally therealong, said light-extracting section having a light-extracting feature located in spaced apart relation to said entrance opening and having a width varying along the longitudinal length of said light-extracting section; and a reflector located at an end of said light guide longitudinally opposite from said light input end of said light guide;

wherein when light from the light source enters said light guide through said light input end, said varying cross-sectional are of said second sub-guide controls a light flux density inside said light guide, a portion of light propagating inside said first sub-guide being redirected by said light-extracting feature inside said light-extracting section to form an effective light-emitting object at said entrance opening of said integral light-concentrating optics, the portion of light being further projected by said integral light-concentrating optics to provide a substantially longitudinal, uniform and concentrated light output of said device.

19. An illumination device as recited by claim 18, further comprising a light-homogenizing section located between the light source and said light input end of said light guide for redirecting light input from the light source into said light guide.

20. An illumination device as recited by claim 18, wherein said light-extracting feature comprises an array of prismatic structures for extracting light and located in spaced apart relation to said entrance opening and having a width varying along the longitudinal length of said light-extracting section.

21. An illumination device as recited by claim 18, wherein said varying cross-sectional area of said second sub-guide decreases in a direction generally longitudinally away from said light input end of said light guide.

22. An illumination device as recited by claim 18, wherein said varying width of said light-extracting feature increases in a direction generally longitudinally away from said light input end of said light guide.

23. An illumination device as recited by claim 18, wherein a light source is provided at opposite longitudinal ends of said light guide and wherein said varying cross-sectional area of said second sub-guide is minimal at a longitudinal mid-point of said light guide.

24. An illumination device as recited by claim 18, wherein a light source is provided at opposite longitudinal ends of said light guide and wherein said varying width of said light-extracting feature is greatest approximately at a longitudinal middle of said light guide.

25. An illumination device for receiving light input from a light source and for producing light output, said illumination device comprising:

a light guide having an input end for receiving light input from the light source and comprising a sub-guide having a generally constant cross-sectional area along the longitudinal length of said light guide and having an entrance opening extending longitudinally along said light guide, said sub-guide providing light-concentrating optics integral to said light guide;

a light-extracting section optically coupled to said sub-guide at said entrance opening and extending substantially longitudinally therealong, said light-extracting section having a light-extracting feature located in spaced apart relation to said entrance opening and having a width varying along the longitudinal length of said light-extracting section; and a reflector located at an end of said light guide longitudinally opposite from said light input end of said light guide;

wherein when light from the light source enters said light guide through said light input end, a portion of light propagating inside said sub-guide being redirected by said light-extracting feature inside said light-extracting section to form an effective light-emitting object at said entrance opening of said integral light-concentrating optics, the portion of light being further projected by said integral light-concentrating optics to provide a substantially longitudinal, uniform and concentrated light output of said device.

26. An illumination device for receiving light input from a light source and for producing light output, said illumination device comprising:

a light guide having an input end for receiving light input from the light source and comprising generally parallel and optically coupled first and second sub guides, said first sub-guide having a generally constant cross-sectional area along the longitudinal length of said light guide and having an entrance opening extending longitudinally along said light guide, said second sub-guide having a generally constant cross-sectional area along the longitudinal length of said light guide, said first sub-guide providing light-concentrating optics integral to said light guide and the operation of said light-concentrating optics being unaffected by said second sub-guide;

a light-extracting section optically coupled to said first sub-guide at said entrance opening and extending substantially longitudinally therealong, said light-extracting section having a light-extracting feature located in spaced apart relation to said entrance opening and having a width varying along the longitudinal length of said light-extracting section; and a reflector located at an end of said light guide longitudinally opposite from said light input end of said light guide;

wherein when light from the light source enters said light guide through said light input end, a portion of light propagating inside said first sub-guide being redirected by said light-extracting feature inside said light-extracting section to form an effective light-emitting object at said entrance opening of said integral light-concentrating optics, the portion of light being further projected by said integral light-concentrating optics to provide a substantially longitudinal, uniform and concentrated light output of said device.

27. An illumination device for receiving light input from a light source and for producing light output, said illumination device comprising:

a light guide having an input end for receiving light input from the light source and comprising generally parallel and optically coupled first and second sub-guides, said first sub-guide having a generally constant cross-sectional area along the longitudinal length of said light guide and having an entrance opening extending longitudinally along said light guide, said second sub-guide having a varying cross-sectional area along the longitudinal length of said light guide, said first sub-guide providing light-concentrating optics integral to said light guide and the operation of said light-concentrating optics being unaffected by said second sub-guide;

a light-extracting section optically coupled to said first sub-guide at said entrance opening and extending substantially longitudinally therealong, said light-extracting section having a light-extracting feature located in spaced apart relation to said entrance opening and having a generally constant width along the longitudinal length of said light-extracting section; and a reflector located at an end of said light guide longitudinally opposite from said light input end of said light guide;

wherein when light from the light source enters said light guide through said light input end, a portion of light propagating inside said first sub-guide being redirected by said light-extracting feature inside said light-extracting section to form an effective light-emitting object at said entrance opening of said integral light-concentrating optics, the portion of light being further projected by said integral light-concentrating optics to provide a substantially longitudinal, uniform and concentrated light output of said device.

28. An illumination device as recited by claim 1, 2, 18, 25, 26 or 27, wherein said light guide is substantially straight over its longitudinal length.

29. An illumination device as recited by claim 1, 2, 18, 25, 26 or 27, wherein said light guide is not substantially straight over its longitudinal length.

30. An illumination device as recited by claim 25, 26 or 27, further comprising a light-homogenizing section located between the light source and said light input end of said light guide for redirecting light input from the light source into said light guide.

31. An illumination device as recited by claim 25, 26 or 27, wherein said light-extracting feature comprises an array of prismatic structures for extracting light and located in spaced apart relation to said entrance opening.

32. An illumination device as recited by claim 27, wherein said varying cross-sectional area of said second sub-guide decreases in a direction generally longitudinally away from said light input end of said light guide.

33. An illumination device as recited by claim 25 or 26, wherein said varying width of said light-extracting feature increases in a direction generally longitudinally away from said light input end of said light guide.

34. An illumination device as recited by claim 27, wherein a light source is provided at opposite longitudinal ends of said light guide and wherein said varying cross-sectional area of said second sub-guide is minimal at a longitudinal mid-point of said light guide.

35. An illumination device as recited by claim 25 or 26, wherein a light source is provided at opposite longitudinal ends of said light guide and wherein said varying width of said light-extracting feature is greatest approximately at a longitudinal middle of said light guide.

36. An illumination device as recited by claim 1, 18, 25, 26 or 27, wherein said light-extracting feature comprises a reflective material provided on an outer surface of said light-extracting section.

* * * * *